(12) United States Patent
Chen et al.

(10) Patent No.: US 6,580,858 B2
(45) Date of Patent: Jun. 17, 2003

(54) MICRO-OPTO-ELECTRO-MECHANICAL SYSTEM (MOEMS)

(75) Inventors: Jingkuang Chen, Rochester, NY (US); Joel A. Kubby, Rochester, NY (US); Decai Sun, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/844,574

(22) Filed: Apr. 30, 2001

(65) Prior Publication Data

US 2002/0168144 A1 Nov. 14, 2002

(51) Int. Cl.[7] .............................................. G02B 6/42
(52) U.S. Cl. ................................. 385/48; 385/49
(58) Field of Search ........................ 385/65, 83, 88, 385/90, 58, 55, 70, 73, 75, 52, 48, 49

(56) References Cited

U.S. PATENT DOCUMENTS

| | | | | |
|---|---|---|---|---|
| 4,240,695 A | * | 12/1980 | Evans ........................... | 385/62 |
| 5,330,926 A | * | 7/1994 | Sato ............................. | 438/247 |
| 5,535,293 A | * | 7/1996 | Buchin ..................... | 250/227.21 |
| 5,751,491 A | * | 5/1998 | Kase et al. ................... | 359/618 |
| 5,764,832 A | * | 6/1998 | Tabuchi ....................... | 385/14 |
| 6,071,426 A | * | 6/2000 | Lee et al. ...................... | 216/2 |
| 6,115,521 A | * | 9/2000 | Tran et al. .................... | 385/33 |
| 6,205,274 B1 | * | 3/2001 | Zhou ........................... | 385/36 |
| 6,301,403 B1 | * | 10/2001 | Heanue et al. ............... | 310/309 |
| 6,302,523 B1 | * | 10/2001 | Smith et al. .................. | 347/45 |
| 6,320,993 B1 | * | 11/2001 | Laor ............................. | 385/16 |
| 6,356,689 B1 | * | 3/2002 | Greywall ..................... | 359/245 |
| 6,363,183 B1 | * | 3/2002 | Koh ............................. | 705/10 |

OTHER PUBLICATIONS

"Surface–Micromachined Free–Space Fiber Optic Switches with Integrated Microactuators for Optical Fiber Communication Systems," by Shi–Sheng Lee, Ed Motamedi and Ming C. Wu, pp. 85–88, 1997 International Conference on Solid–State Sensors and Actuators, Chicago, Jun. 16–19, 1997.

"Free–Space Fiber–Optic Switches Based on MEMS Vertical Torsion Mirrors," by Shi–Sheng Lee, Long–Sun Huang, Chang–Jin Kim and Ming C. Wu, pp. 7–13, *Journal of Lightwave Technology*, vol. 17, No. 1, Jan. 1999.

"MEMS RF Switch," Web URL http://cjmems.seas.ucla.edu/Research/RFswitch.htm, by Siddharth Kiyawat, *UCLA Micromanufacturing Laboratory for MEMS*, at least as early as Jan. 29, 2001, Available from http://cjmems.seas.ucla.edu/research.htm.

"MEMS Packaging for Micro Mirror Switches," by Long Sun Huang, S.–S. Lee, E. Motamedi, M. C. Wu and C.–J. Kim, Proc. 48th Electronic Components & Technology Conference, Seattle, WA, May 1998, pp. 592–597. This material is described in http://cjmems.seas.ucla.edu/research.htm.

"1×2 Optical MEM Switch," Slide 39, Spring 2000, Available from http://fuji.stanford.edu/seminars/sprint00/slides/levitanSlides/sld039.htm.

* cited by examiner

*Primary Examiner*—Robert H. Kim
*Assistant Examiner*—Richard Kim
(74) *Attorney, Agent, or Firm*—David E. Henn

(57) ABSTRACT

A MEMS-based adjustable mirror module allows faster, lower cost, and easier alignment of optical fibers in substrates. Movable mirrors formed on the substrate allow adjustment of the light path after the optical fiber is attached, after which the mirrors are affixed in place to prevent misalignment.

30 Claims, 4 Drawing Sheets

MICRO-OPTO-ELECTRO-MECHANICAL SYSTEM (MOEMS)

BACKGROUND OF THE INVENTION

Optical switches and other optoelectronic devices have advanced rapidly with developments in manufacturing technologies over the years. With the advent of Micro Electro Mechanical Systems (MEMS) technology, such devices could be made smaller, but problems arose when trying to align a light beam emitting from an optical fiber transporting light between a light source and transmission/conversion chips. These conversion chips generally provide the function of optical switching or conversion to/from electrical signals. For single-mode optical fibers, the tolerance of alignment between fibers and the targeted area is usually about 0.1 $\mu$m. Multi-mode optical fibers have a slightly wider alignment tolerance, however this is usually still below 5 $\mu$m. Such high-precision alignments are currently performed manually and are expensive.

An additional disadvantage of current Micro Optical Electrical Mechanical Systems (MOEMS) is that in order to tolerate misalignment of optical fibers, the active area of the photodiode is generally enlarged to cover all areas on which light can project. A larger active area yields a larger p-n junction, resulting in a large junction capacitance that can lower the switching speed of the MOEMS system. Manual alignment is generally needed in the aforementioned system to achieve higher conversion efficiency.

For these reasons, development of a low cost, high-precision alignment mechanism for fiber-chip connections is important to, for example, reduce the cost of hardware of optical fiber communication systems and also reduce the costs of many optical systems that require optical fibers as media for guiding light signals.

SUMMARY OF THE INVENTION

The principles of the present invention provide for a Micro Optical Electro Mechanical System (MOEMS) including a MEMS mirror module for high-precision alignment between optical fibers and MOEMS chips. Instead of aligning chips and optical fibers under a microscope, the present invention uses an easier method: adjusting the path of a light beam emerging from an optical fiber with MEMS mirrors such that the light beam projects on a targeted area. The beam divergence problem introduced when the light waves travel through free space between mirrors can be solved by passing the beam through a curved optical element, such as a spherically curved mirror or a lens in the mirror module, to converge and/or collimate the light. Through experiments, it was found that the efficiency of, for example, a five-mirror module is on the order of approximately 62.4% when the MEMS mirrors are coated with gold, which is high enough for most applications.

BRIEF DESCRIPTION OF THE DRAWINGS

This disclosure includes the attached Figures, which Figures are summarized as follows.

DETAILED DESCRIPTION

MEMS technology provides a solution to the problems described above, particularly to the costly manual alignment of optical fibers. Instead of moving chips and optical fibers under a microscope, a user adjusts the path of the light beam with MEMS mirrors that project the light beam on the prescribed spot. Before describing the subject approach designed to align an optical fiber on a MOEMS chip, an exemplary machine that might include the system will be described.

Figure 1:
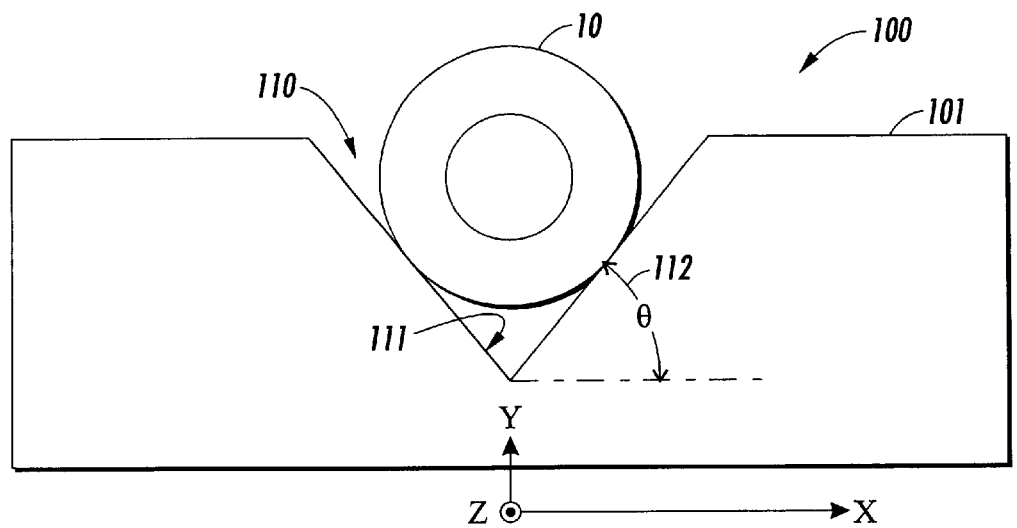
FIG. 1 shows a schematic cross section of a portion of embodiments of the invention.
Figure 2:
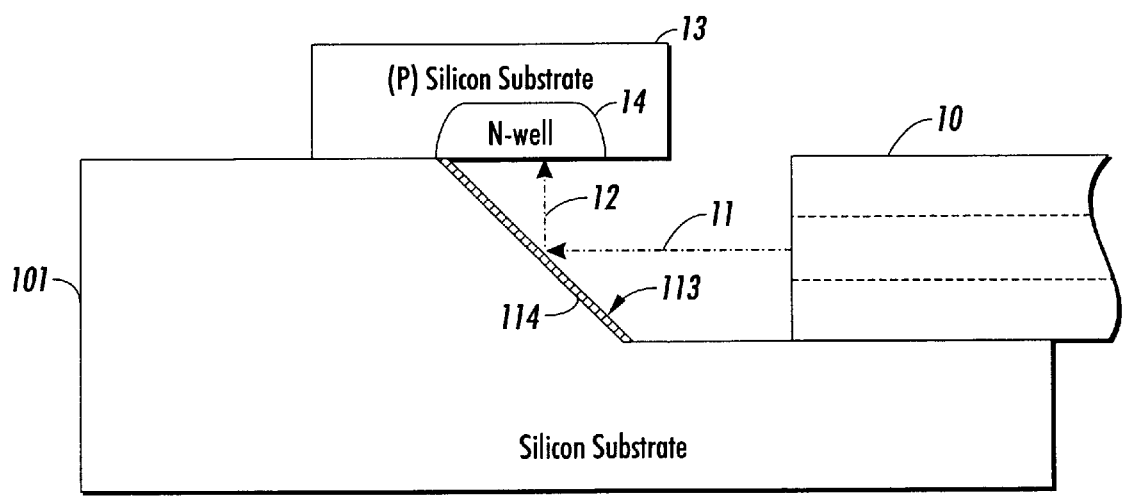
FIG. 2 shows a schematic cross section of a portion of embodiments of the invention with a device positioned atop the substrate.

As illustrated in the FIGS., and particularly in FIGS. 1 and 2, device 100 includes a substrate 101 in which a groove 110 is formed. An optical fiber 10 lies in the groove 110 with its end facing a reflective inclined end surface 113 of the groove. The inclination angle 115 of the groove end surface 113 is less than 90 degrees relative to an imaginary extension of the bottom surface of the groove 110, as shown, for example, in FIGS. 4 and 7, so that light 11 incident upon the reflective end surface 113 reflects out of the groove 110, as represented by arrow 12. In embodiments, the angle of the end surface is between about 45 and about 65 degrees as measured from the bottom of the groove; an angle of about 54.7 degrees is beneficial in some embodiments. In one exemplary implementation of the device 100, the light can shine upon an optical device. For example, the optical device can be a photodetector, spectrophotometric grid, interferometer, diffraction grating, or another optical or optoelectronic element, such as the flip-chip bonded optical device 13 shown in FIG. 2. To enhance performance of the reflective end surface 113, a coating 114 of a reflection enhancing material, such as gold or silver, can be included.

Figure 3:
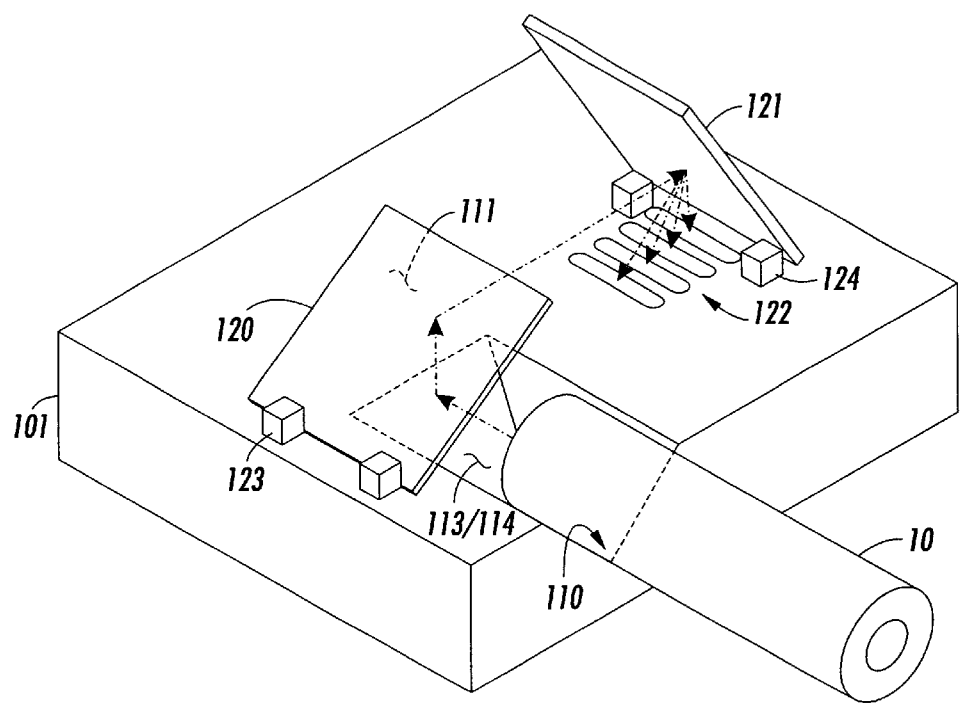
FIG. 3 is a schematic elevational view of a portion of embodiments of the invention with additional mirrors and an optical device atop the substrate.
Figure 4:
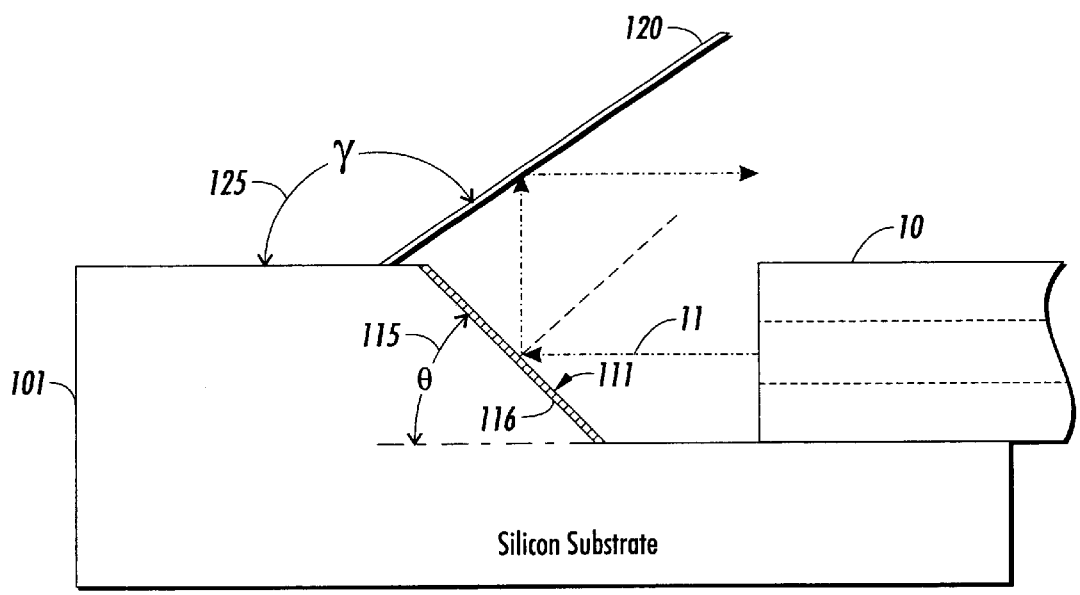
FIG. 4 is a schematic cross sectional view of the view of FIG. 4.

As indicated in FIGS. 3 and 4, the integration of optical components into a MOEMS is permitted. For example, an optical device 124, such as a photodiode array, can be placed on the substrate 101 and can receive light 11 from the fiber 10 via mirrors formed on the substrate 101. Also, for example, one mirror 120 can be placed above the reflective end surface 113 of the groove 110 so that it reflects the light toward another mirror 121 that reflects the light onto the optical device 124. The mirrors 120, 121 can be held on the substrate with hinges 123, 124, and are preferably formed from polysilicon, single crystal silicon, or another suitable material. When desired, the mirrors 120, 121 can be coated in similar fashion to the end surface 113 to enhance their reflectivity. Thus, the mirrors 120, 121 and the reflective end surface 113 form a light path between the end of the optical fiber 10 and the optical device 124, and can send light from one to the other, vice versa, or both. As seen particularly in FIG. 4, the first mirror 120 is positioned to reflect the light parallel to the surface of the substrate 101.

Figure 5:
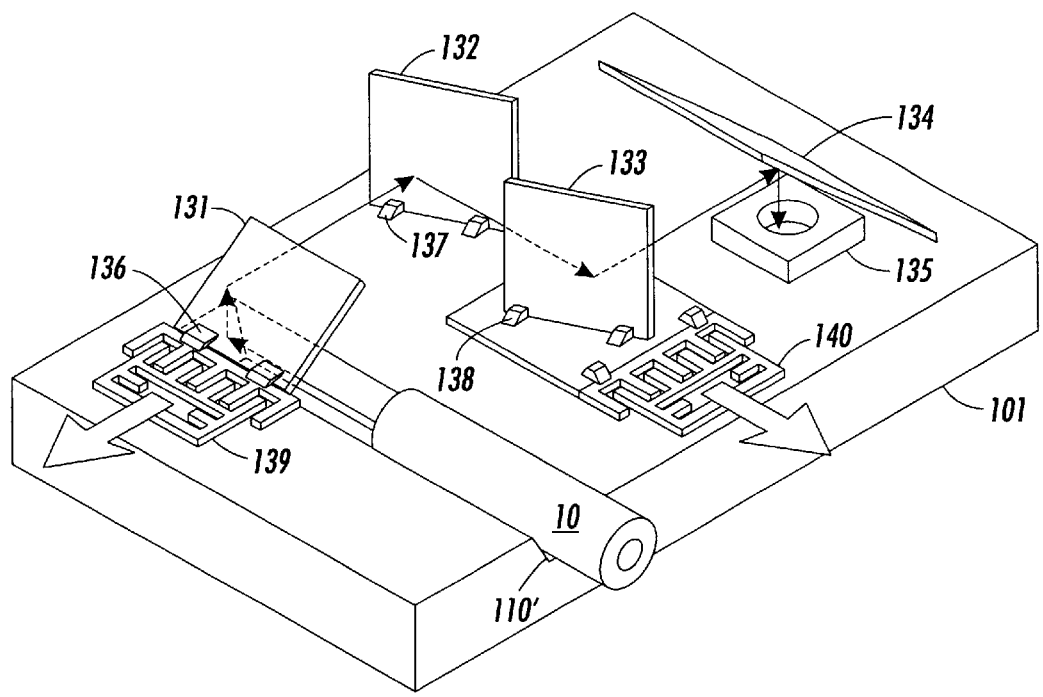
FIG. 5 shows a comprehensive schematic elevational view of a preferred implementation of embodiments of the invention including movable and fixed mirrors and an optical device atop the substrate.

FIG. 5 illustrates one specific implementation of a MOEMS. In this example, an anisotropic wet etch, in which potassium hydroxide (KOH) or the like is used to etch or erode the substrate surface with techniques known in the art, defines a V- or trapezoidal-shaped trench or groove 110, 110' into the substrate 101. Fibers requiring, for example, a 200 μm-deep groove have been used, but it should be readily apparent to those skilled in the art that the size of the trench 110 will vary widely depending upon the particular dimensions of the fibers used and the particular desired module characteristics. The trench 110 is oriented so that the surface 113 at the end of the trench 110 can be used to reflect the light 11 upward to a mirror 131 similar to that shown in FIG. 3. Preferably, as with the mirrors of FIG. 3, the mirror 131 is formed from polysilicon or single-crystal silicon (SCS). The diameter of many single-mode optical fibers is approximately 100–125 μm and can fit well into a 200 μm-deep groove with misalignment in the x and y directions of less than 1.0 μm, as shown in FIG. 1. The etched surfaces are smooth enough to function as efficient optical mirrors as demonstrated in literatures. As mentioned above, the surface can be coated with gold or aluminum to increase the reflectivity of the mirror. As shown in FIG. 3, when a mirror 120 is added on top of the trench 110 and is oriented at about 35.3° relative to the chip surface in various embodiments, the light reflected from the mirror will be substantially parallel to the chip surface. With the addition of another MEMS mirror 121, or of another optical device, such as a grating plate, the light from an optical fiber can be guided to project on an on-chip optical device 122, such as a photo-diode array as shown in FIG. 3 for spectroscopy application.

When an optical fiber 10 is put into this V-shaped groove or trench 110, misalignments in the x direction, the y direction, or both, can occur, as shown in FIG. 1. Any misalignment in the z-direction can change the coupling efficiency from the fiber 10 to the chip 101 but not the projection position on the targeted optical device 122. As shown in FIG. 3, taking the MEMS spectrophotometer as an example, any misalignment in the x-detraction can be resolved by extending the width of the active region of photo diodes in the optical device 122. For example, when the optical fiber 10 is misaligned 10 μm in the x-direction, the reflected light will be shifted 10 μm laterally on the grating plate. However, because of the extended width of each photodiode pixel, the light dissolved from the grating plate 121 will still fall on the active region of photo-diodes. When the fiber 10 is misaligned in the y-direction (perpendicular to the wafer surface), the light output will shift along the photodiode array. For example, when the original design the spectral components should fall on photo diodes number 101 to 612 in the array, because of misalignment the optical signals may be shifted to falling on photo diodes 218 to 729. In this case, the output signals from the photo diode array have to be calibrated to compensate the offset. Applying a reference light source to identify its projection address on the photo diode array can achieve this. This is usually a one-time calibration and can be performed after the fiber is assembled on the chip.

Particular Description of a Five-Mirror Alignment Module

With the addition of comb drive actuators 139, 140 and additional mirrors 132, 133, the misalignment in x and y direction can be corrected by applying an electrical signal on the actuators 139, 140 to adjust the position of the MEMS mirrors 131, 133, as shown in FIG. 5. FIG. 5 shows a 5-mirror module for fiber-chip connection. The optical fiber 10 is fitted into a trapezoidal/triangular groove 110 etched into the silicon substrate 101. The depth and width of this trapezoidal groove 110 is designed to accommodate an optical fiber 10 such that the light 11 can be guided to hit on the surface 113 at the end of the trapezoidal groove 110, and be reflected upward along a path as designed. The surface 113 can be coated with gold or another suitable material 114 to increase its reflectivity. As the etch of this trapezoidal groove 110 can be accurately controlled to within ±1 μm, the misalignment on positioning optical fibers 10 into the trapezoidal groove 110 can be minimized, and this small deviation can be fixed by adjusting the position of the guiding mirrors. After the optical fiber 10 is put on its final position in the trapezoidal groove 110, it can be glued on in this position. This does not require a high-precision alignment because the relative position between the fiber and the chip is largely controlled by the photolithography step and the wet etch used to define the trapezoidal groove 110.

Figure 6:
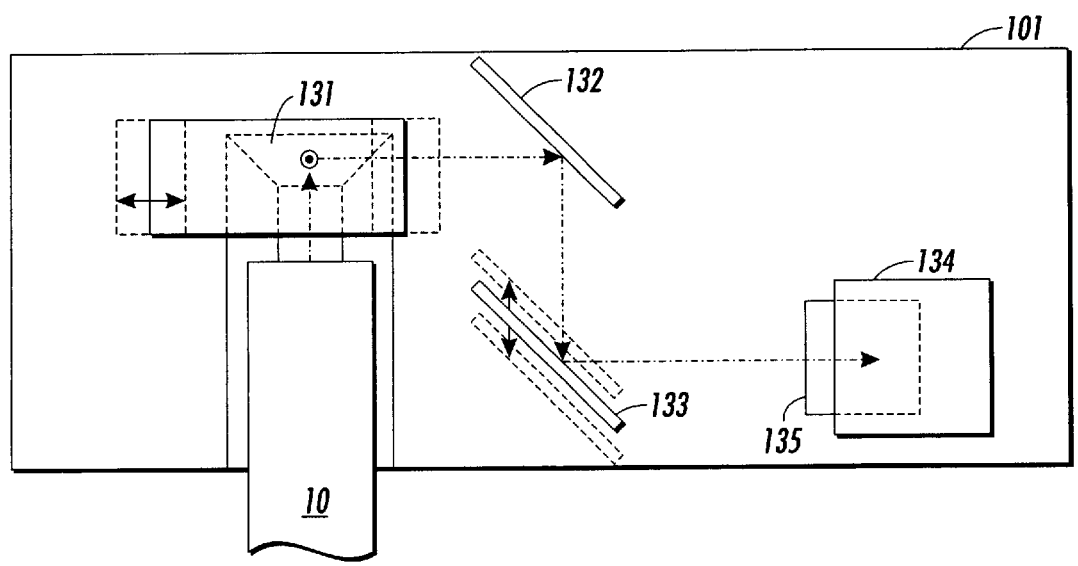
FIG. 6 is a top view of the view of FIG. 5.
Figure 7:
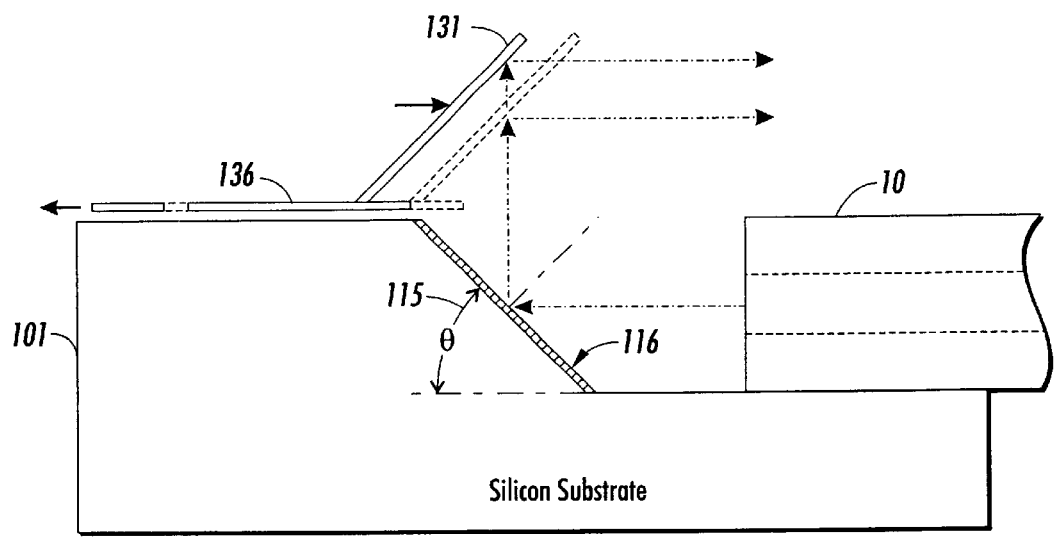
FIG. 7 is a cross sectional side view of the groove shown in FIGS. 5 and 6.

After being reflected by the reflecting end surface 113 in the trapezoidal groove 110, the light 11 is guided to hit a movable mirror 131, as shown in FIGS. 5 and 6. This mirror 131 sits on an movable platform 136, as shown in FIG. 7, and its position can be adjusted by applying an voltage on the electrostatic comb drive 139 which is attached to the platform 136. With the adjustment of position of the first mirror 121, the height (perpendicular to the wafer surface) of the outgoing light beam can be controlled. This latitude of control is converted into the adjustment of x-position of the light beam after it reaches the final mirror 134, which is shown as being fixed in this exemplary implementation. The light signals are next guided to impinge on a fixed mirror 132, then a second movable mirror 133. The movement of the second movable mirror 133 provides the latitude of controlling the y-position of its final falling spot on the optical device 135, such as a photo-diode/laser diode, as shown in FIGS. 5 and 6.

Another factor is the divergence of the light beam after it leaves a fiber. The increase in the beam size as a function of the free space propagation distance can be calculated according to the Gaussian beam theory. The light beam with a wavelength λ, after it propagates in free space for a distance z away from the origin, where the light beam has the smallest radius $r_0$, has a beam radius:

$$r(z) = r_0 \left[ 1 + \left( \frac{z\lambda}{r_0^2 \pi} \right)^2 \right]^{\frac{1}{2}}$$

The length of free space light path in this system is preferably in the range of from about 600 μm to about 800 μm and will introduce a beam divergence problem.

To compensate for beam divergence associated with the long light path introduced by this 5-mirror system, the first movable mirror 131 can, for example, be made spherically curved to converge the light beam.

Efficiency of a 5-Mirror Light Guiding System

Figure 8:
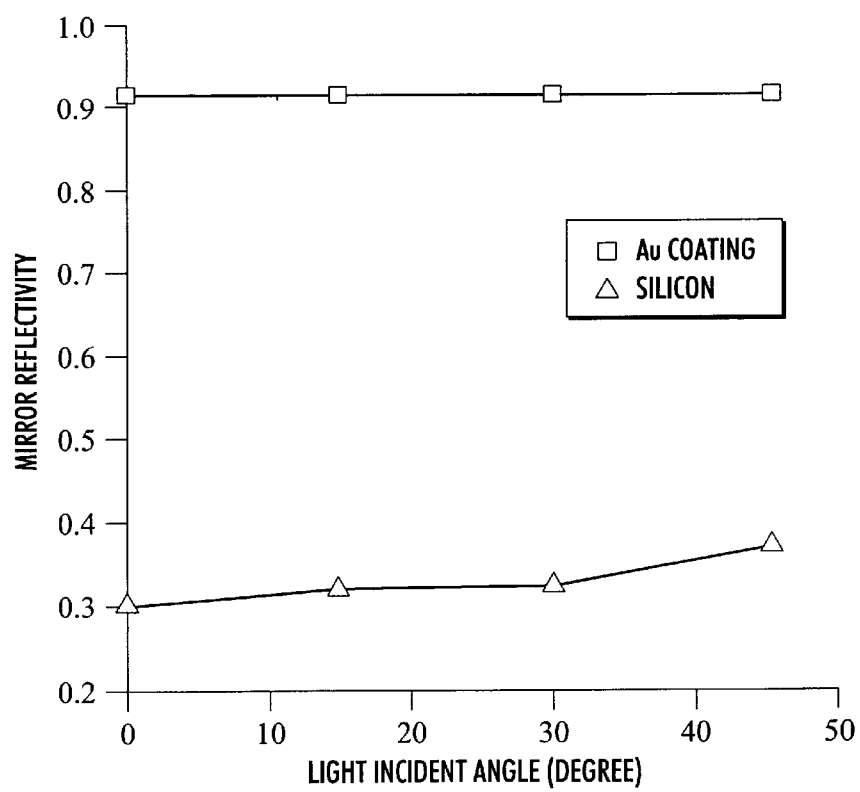
FIG. 8 is a chart illustrating the relative performances of two different types of mirrors that can be used with the invention.

One concern about such a 5-mirror light guiding system is the efficiency of the light signal after multiple reflection. The efficiency of this light guiding system is $$E = R_1 \cdot R_2 \cdot R_3 \cdot R_4 \cdot R_5$$

where $R_1$, $R_2$, $R_3$, $R_4$, $R_5$ are the reflectivities of MEMS mirrors (includes the silicon surface mirror in the groove), respectively. Now when the mirror used is single-crystal silicon surface, the reflectivity is shown in FIG. 8. The wavelength of the light source used in this measurement was 1.55 μm. Without gold coating, the reflectivity ranges from 32% to 37%, depending on the incident angles of light. In this case, the efficiency of this 5-mirror system is $$E = 0.33 \cdot 0.36 \cdot 0.37 \cdot 0.37 \cdot 0.37 = 0.0056 \approx 0.5\%$$

The reflectivity of the MEMS mirror increases to about 91% when the mirrors are coated with gold, and the overall system efficiency is $$H = 0.91 \cdot 0.91 \cdot 0.91 \cdot 0.91 \cdot 0.91 = 0.624 \approx 62.4\%$$

This efficiency value is adequate for most applications.

It is known in the art that a polysilicon mirror after chemical mechanical polish (CMP) has a reflectivity similar to that of a SCS mirror. As a result, a polysilicon mirror module would provide an overall reflectivity close to that of SCS mirrors. After the mirrors are moved to their final positions, the platform supporting these mirrors will be glued to these positions and the voltages on the comb drives will be turned off.

The preceding description of the invention is exemplary in nature as it pertains to particular embodiments disclosed and no limitation as to the scope of the claims is intended by the particular choices of embodiments disclosed.

Other modifications of the present invention may occur to those skilled in the art subsequent to a review of the present application, and these modifications, including equivalents thereof, are intended to be included within the scope of the present invention.

What is claimed is:

1. An integrated optical fiber alignment mirror module comprising:
    a first wafer having a first surface and a second surface, the wafer having a groove formed in and extending along the first surface and parallel to the second surface;
    a groove end reflector formed in an end of the groove in the first wafer;
    a layer having a first region, the layer being attached to the first surface;
    a first substrate mirror fashioned from the first region of the layer;
    an optical device on the first wafer; and
    an optical path extending between the groove and the optical device via optical communication between the groove end reflector and the first substrate mirror whereby light emitted from one of the optical device and an object in the groove travels to the other of the optical device and the object in the groove via the optical path.

2. The module of claim 1 wherein the groove is V-shaped.

3. The module of claim 2 wherein an end surface of the V-shaped groove is inclined at an angle in the range of from about 45 degrees to about 65 degrees measured from a plane parallel to the first surface and serves at least as a base for the mirror formed in an end of the groove.

4. The module of claim 3 wherein the angle is about 54.7 degrees.

5. The module of claim 1 wherein the first wafer is a silicon on insulator (SOI) wafer.

6. The module of claim 1 wherein the layer is a single crystal silicon layer.

7. The module of claim 1 wherein an optical fiber is in the groove.

8. The module of claim 7 wherein light from a light source exits an end of the optical fiber and enters the optical path, thereby traveling to the optical device.

9. The module of claim 7 wherein the optical device is a light source and light from the light source enters the optical path, thereby traveling to and entering an end of the optical fiber.

10. The module of claim 1 wherein the groove is deep reactive ion etched (DRIE).

11. The module of claim 1 wherein the first substrate mirror is positioned on a platform movable during a calibration of the module, thereby allowing adjustment of the optical path.

12. The module of claim 11 further comprising a plurality of substrate mirrors in the optical path, at least one of the plurality of substrate mirrors being positioned on a respective platform movable during a calibration of the module, thereby allowing further adjustment of the optical path during calibration of the module.

13. The module of claim 11 wherein post-calibration movement of the first substrate mirror is substantially minimized by material applied after adjustment of the optical path.

14. The module of claim 13 wherein the material is an adhesive.

15. An integrated optical fiber alignment mirror module comprising:
    a groove formed in a substrate, the groove having an end in the substrate, the end being inclined relative to a bottom of the groove, the inclination of the end being less than 90 degrees as measured from an imaginary extension of the bottom of the groove to a surface of the end;
    an optical element in the groove and positioned to allow light to shine between the optical element and the surface of the end of the groove;
    the surface of the end of the groove being substantially reflective so that light incident thereon from the optical element reflects from the surface and our of the groove; and
    a reflector mounted on the substrate in optical communication with the reflective surface of the groove end.

16. The module of claim 15 further comprising an optical device in optical communication with the reflective end surface of the groove.

17. The module of claim 16 wherein the optical device resides on a second substrate mounted on the module substrate.

18. The module of claim 17 wherein the second substrate is affixed to the module substrate with solder bumps.

19. The module of claim 16 wherein the optical device resides on the module.

20. The module of claim 15 further comprising a movable mounting device supporting the reflector and allowing positional adjustment of the reflector.

21. The module of claim 20 wherein the movable mounting device is an electrostatic comb drive.

22. The module of claim 15 wherein the substrate reflector is a first substrate reflector and further including a second substrate reflector.

23. The module of claim 22 wherein at least one of the first and second substrate reflectors rests on an actuator that can adjust the reflector position.

24. The module of claim 23 wherein the at least one actuator is an electrostatic comb drive.

25. A method comprising:
    forming a groove in a substrate on which an optical device resides;
    forming a groove end reflector at an end of the groove;

forming first and second actuators on a surface of the substrate;

forming first and second substrate reflectors on the first and second actuators, respectively, to establish an optical path between the groove end reflector and the optical device;

mounting an optical fiber in the groove with an end of the fiber in optical communication with the groove end reflector so that light can travel between the optical path and the end of the optical fiber;

causing light to travel along the optical path;

adjusting positions of the first and second substrate mirrors with their respective actuators to maximize light transmission between the optical device and the optical fiber; and affixing the first and second substrate mirrors in respective positions corresponding to maximized light transmission on the optical path.

26. The method of claim 25 wherein forming a groove includes the step of deep reactive ion etching the substrate to form the groove.

27. The method of claim 25 wherein forming the groove end reflector includes the step of polishing an end of the groove.

28. The method of claim 25 wherein forming the groove includes the step of coating an end of the groove with a reflective material.

29. The method of claim 25 wherein forming the actuators includes the steps of depositing a layer of material on the substrate, then removing a portion of the material to leave the actuators behind on the surface of the substrate.

30. The method of claim 25 wherein forming the substrate reflectors includes the steps of depositing a layer of material on at least the actuators, then removing a portion of the material to leave the substrate reflectors behind on the surface of the respective actuators.

* * * * *

UNITED STATES PATENT AND TRADEMARK OFFICE
CERTIFICATE OF CORRECTION

PATENT NO.   : 6,580,858 B2
DATED        : June 17, 2003
INVENTOR(S)  : Jingkuang Chen, Joel A. Kubby and Decai Sun It is certified that error appears in the above-identified patent and that said Letters Patent is hereby corrected as shown below:

<u>Column 1,</u>
Line 3, the following paragraph should be added:
-- This invention was made with United States Government support awarded by the Department of Commerce under Contract No. 70NANB8H4014. The United States Government has certain rights in this invention. --

Signed and Sealed this

Eighth Day of June, 2004

JON W. DUDAS
*Acting Director of the United States Patent and Trademark Office*